(12) United States Patent
Simmons

(10) Patent No.: US 7,748,032 B2
(45) Date of Patent: Jun. 29, 2010

(54) METHOD AND APPARATUS FOR ASSOCIATING TICKETS IN A TICKET HIERARCHY

(75) Inventor: Timothy Ernest Simmons, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1558 days.

(21) Appl. No.: 10/711,729

(22) Filed: Sep. 30, 2004

(65) Prior Publication Data
US 2006/0095334 A1    May 4, 2006

(51) Int. Cl.
G06F 7/04     (2006.01)
G06F 15/16    (2006.01)
G06F 17/30    (2006.01)
H04L 29/06    (2006.01)

(52) U.S. Cl. ....................................................... 726/10
(58) Field of Classification Search ..................... 726/10
See application file for complete search history.

(56) References Cited

U.S. PATENT DOCUMENTS

| | | |
|---|---|---|
| 4,779,189 A | 10/1988 | Legvold et al. |
| 5,057,996 A | 10/1991 | Cutler et al. |
| 5,129,084 A | 7/1992 | Kelly, Jr. et al. |
| 5,175,852 A | 12/1992 | Johnson et al. |
| 5,187,790 A | 2/1993 | East et al. |
| 5,202,971 A | 4/1993 | Henson et al. |
| 5,249,290 A | 9/1993 | Heizer |
| 5,297,283 A | 3/1994 | Kelly, Jr. et al. |
| 5,321,841 A | 6/1994 | East et al. |
| 5,341,478 A | 8/1994 | Travis, Jr. et al. |
| 5,418,964 A | 5/1995 | Conner et al. |
| 5,437,025 A | 7/1995 | Bale et al. |
| 5,461,608 A | 10/1995 | Yoshiyama |
| 5,473,599 A | 12/1995 | Li et al. |
| 5,499,343 A | 3/1996 | Pettus |
| 5,504,814 A | 4/1996 | Miyahara |
| 5,511,208 A | 4/1996 | Boyles et al. |
| 5,515,508 A | 5/1996 | Pettus et al. |
| 5,553,242 A | 9/1996 | Russell et al. |
| 5,557,748 A | 9/1996 | Norris |
| 5,561,769 A | 10/1996 | Kumar et al. |
| 5,586,312 A | 12/1996 | Johnson et al. |
| 5,590,199 A * | 12/1996 | Krajewski et al. ........... 713/159 |
| 5,596,745 A | 1/1997 | Lai et al. |

(Continued)

FOREIGN PATENT DOCUMENTS

| | | |
|---|---|---|
| AU | 3403602   | 5/2002 |
| CA | 2307008   | 10/2000 |
| CA | 2421609   | 3/2002 |
| EP | 0 442 839 A2 | 8/1991 |

(Continued)

OTHER PUBLICATIONS

Citrix, Citrix MetaFrame XPa for Windows, 2001, Citrix.*

(Continued)

*Primary Examiner*—David Garcia Cervetti
(74) *Attorney, Agent, or Firm*—Choate Hall & Stewart LLP; John D. Lanza; Christopher J. McKenna

(57) ABSTRACT

A method and apparatus for associating session ticket includes a ticketing authority server. The ticketing authority server receives a ticket generation request and information about a client node. It identifies a master session ticket associated in a storage element with the client node. The ticketing authority server then generates a derivative session ticket for the client node and associates the derivative session ticket with the master session ticket. Finally, the ticketing authority server stores information about the client node and the derivative session ticket in the storage element.

14 Claims, 3 Drawing Sheets

U.S. PATENT DOCUMENTS

| | | |
|---|---|---|
| 5,606,668 A | 2/1997 | Shwed et al. |
| 5,633,929 A | 5/1997 | Kaliski, Jr. |
| 5,657,390 A | 8/1997 | Elgamal et al. |
| 5,701,484 A | 12/1997 | Artsy |
| 5,706,437 A | 1/1998 | Kirchner et al. |
| 5,729,734 A | 3/1998 | Parker et al. |
| 5,734,865 A | 3/1998 | Yu |
| 5,737,622 A | 4/1998 | Rogers et al. |
| 5,757,795 A | 5/1998 | Schnell |
| 5,761,662 A | 6/1998 | Dasan |
| 5,764,915 A | 6/1998 | Heimsoth et al. |
| 5,794,207 A | 8/1998 | Walker et al. |
| 5,802,306 A | 9/1998 | Hunt |
| 5,828,840 A | 10/1998 | Cowan et al. |
| 5,835,726 A | 11/1998 | Shwed et al. |
| 5,838,910 A | 11/1998 | Domenikos et al. |
| 5,838,916 A | 11/1998 | Domenikos et al. |
| 5,844,553 A | 12/1998 | Hao et al. |
| 5,848,410 A | 12/1998 | Walls et al. |
| 5,860,068 A | 1/1999 | Cook |
| 5,867,494 A | 2/1999 | Krishnaswamy et al. |
| 5,884,046 A | 3/1999 | Antonov |
| 5,928,363 A * | 7/1999 | Ruvolo ................. 726/22 |
| 5,938,733 A | 8/1999 | Heimsoth et al. |
| 5,951,694 A | 9/1999 | Choquier et al. |
| 5,960,170 A | 9/1999 | Chen et al. |
| 5,968,176 A | 10/1999 | Nessett et al. |
| 5,983,190 A | 11/1999 | Trower, II et al. |
| 5,983,268 A | 11/1999 | Freivald et al. |
| 5,987,611 A | 11/1999 | Freund |
| 5,999,179 A | 12/1999 | Kekic et al. |
| 5,999,525 A | 12/1999 | Krishnaswamy et al. |
| 6,003,030 A | 12/1999 | Kenner et al. |
| 6,032,260 A * | 2/2000 | Sasmazel et al. .......... 726/10 |
| 6,058,431 A | 5/2000 | Srisuresh et al. |
| 6,085,247 A | 7/2000 | Parsons, Jr. et al. |
| 6,088,728 A * | 7/2000 | Bellemore et al. .......... 709/227 |
| 6,108,712 A | 8/2000 | Hayes, Jr. |
| 6,151,599 A | 11/2000 | Shrader et al. |
| 6,157,953 A | 12/2000 | Chang et al. |
| 6,161,126 A | 12/2000 | Wies et al. |
| 6,199,753 B1 | 3/2001 | Tracy et al. |
| 6,219,669 B1 | 4/2001 | Haff et al. |
| 6,223,288 B1 | 4/2001 | Byrne |
| 6,272,556 B1 | 8/2001 | Gish |
| 6,301,658 B1 * | 10/2001 | Koehler ................. 713/155 |
| 6,321,337 B1 | 11/2001 | Reshef et al. |
| 6,335,927 B1 | 1/2002 | Elliott et al. |
| 6,345,239 B1 | 2/2002 | Bowman-Amuah |
| 6,377,952 B1 | 4/2002 | Inohara et al. |
| 6,383,478 B1 | 5/2002 | Prokop et al. |
| 6,405,219 B2 | 6/2002 | Saether et al. |
| 6,405,252 B1 | 6/2002 | Gupta et al. |
| 6,412,007 B1 | 6/2002 | Bui et al. |
| 6,415,329 B1 | 7/2002 | Gelman et al. |
| 6,421,726 B1 | 7/2002 | Kenner et al. |
| 6,427,132 B1 | 7/2002 | Bowman-Amuah |
| 6,442,571 B1 | 8/2002 | Haff et al. |
| 6,452,915 B1 | 9/2002 | Jorgensen |
| 6,463,470 B1 | 10/2002 | Mohaban et al. |
| 6,463,474 B1 | 10/2002 | Fuh et al. |
| 6,466,984 B1 | 10/2002 | Naveh et al. |
| 6,470,453 B1 | 10/2002 | Vilhuber |
| 6,496,935 B1 | 12/2002 | Fink et al. |
| 6,502,125 B1 | 12/2002 | Kenner et al. |
| 6,502,131 B1 | 12/2002 | Vaid et al. |
| 6,519,581 B1 | 2/2003 | Hofmann et al. |
| 6,584,569 B2 | 6/2003 | Reshef et al. |
| 6,587,878 B1 | 7/2003 | Merriam |
| 6,606,744 B1 | 8/2003 | Mikurak |
| 6,609,154 B1 | 8/2003 | Fuh et al. |
| 6,611,867 B1 | 8/2003 | Bowman-Amuah |
| 6,625,643 B1 | 9/2003 | Colby et al. |
| 6,625,645 B1 | 9/2003 | Van Horne et al. |
| 6,640,240 B1 | 10/2003 | Hoffman et al. |
| 6,640,248 B1 | 10/2003 | Jorgensen |
| 6,643,774 B1 * | 11/2003 | McGarvey ................. 713/155 |
| 6,665,706 B2 | 12/2003 | Kenner et al. |
| 6,671,818 B1 | 12/2003 | Mikurak |
| 6,691,232 B1 | 2/2004 | Wood et al. |
| 6,697,849 B1 | 2/2004 | Carlson |
| 6,701,432 B1 | 3/2004 | Deng et al. |
| 6,718,380 B1 | 4/2004 | Mohaban et al. |
| 6,721,784 B1 * | 4/2004 | Leonard et al. ............. 709/206 |
| 6,731,625 B1 | 5/2004 | Eastep et al. |
| 6,741,853 B1 | 5/2004 | Jiang et al. |
| 6,754,181 B1 | 6/2004 | Elliott et al. |
| 6,766,454 B1 | 7/2004 | Riggins |
| 6,769,000 B1 * | 7/2004 | Akhtar et al. ........... 707/103 R |
| 6,772,203 B1 | 8/2004 | Feiertag et al. |
| 6,772,347 B1 | 8/2004 | Xie et al. |
| 6,799,221 B1 | 9/2004 | Kenner et al. |
| 6,850,943 B2 | 2/2005 | Teixeira et al. |
| 6,856,651 B2 | 2/2005 | Singh |
| 6,868,404 B1 * | 3/2005 | Ono et al. ................... 705/55 |
| 6,868,451 B1 | 3/2005 | Peacock |
| 6,871,346 B1 | 3/2005 | Kumbalimutt et al. |
| 6,873,988 B2 | 3/2005 | Herrmann et al. |
| 6,880,005 B1 | 4/2005 | Bell et al. |
| 6,901,072 B1 | 5/2005 | Wong |
| 6,901,075 B1 | 5/2005 | Baron |
| 6,909,708 B1 | 6/2005 | Krishnaswamy et al. |
| 6,914,886 B2 | 7/2005 | Peles et al. |
| 6,920,502 B2 | 7/2005 | Araujo et al. |
| 6,963,981 B1 | 11/2005 | Bailey et al. |
| 6,993,016 B1 | 1/2006 | Liva et al. |
| 7,036,051 B1 | 4/2006 | Fernandes |
| 7,079,499 B1 * | 7/2006 | Akhtar et al. ............... 370/310 |
| 7,092,370 B2 | 8/2006 | Jiang et al. |
| 7,100,054 B2 | 8/2006 | Wenisch et al. |
| 7,100,195 B1 | 8/2006 | Underwood |
| 7,102,996 B1 | 9/2006 | Amdahl et al. |
| 7,113,962 B1 | 9/2006 | Kee et al. |
| 7,114,180 B1 | 9/2006 | DeCaprio |
| 7,117,359 B2 * | 10/2006 | Wood et al. ................. 713/155 |
| 7,117,504 B2 | 10/2006 | Smith et al. |
| 7,120,666 B2 | 10/2006 | McCanne et al. |
| 7,124,101 B1 | 10/2006 | Mikurak |
| 7,130,807 B1 | 10/2006 | Mikurak |
| 7,136,645 B2 | 11/2006 | Hanson et al. |
| 7,145,898 B1 | 12/2006 | Elliott |
| 7,246,230 B2 * | 7/2007 | Stanko ................. 713/155 |
| 7,260,840 B2 | 8/2007 | Swander et al. |
| 7,269,664 B2 | 9/2007 | Hutsch et al. |
| 7,353,533 B2 | 4/2008 | Wright et al. |
| 7,363,347 B2 | 4/2008 | Thomas |
| 7,367,044 B2 * | 4/2008 | Fowler et al. ................. 726/1 |
| 7,395,428 B2 * | 7/2008 | Williams et al. ............. 713/170 |
| 7,522,732 B2 | 4/2009 | Whitehead |
| 2001/0023421 A1 | 9/2001 | Numao et al. |
| 2001/0037387 A1 | 11/2001 | Gilde et al. |
| 2001/0047406 A1 | 11/2001 | Araujo et al. |
| 2002/0032725 A1 | 3/2002 | Araujo et al. |
| 2002/0035451 A1 | 3/2002 | Rothermel |
| 2002/0053023 A1 * | 5/2002 | Patterson et al. ............. 713/156 |
| 2002/0111972 A1 | 8/2002 | Lynch et al. |
| 2002/0133723 A1 * | 9/2002 | Tait ................. 713/201 |
| 2002/0138618 A1 | 9/2002 | Szabo |
| 2002/0147927 A1 * | 10/2002 | Tait ................. 713/201 |
| 2002/0152373 A1 | 10/2002 | Sun et al. |
| 2002/0152382 A1 * | 10/2002 | Xiao ................. 713/173 |
| 2002/0165971 A1 | 11/2002 | Baron |
| 2002/0184224 A1 | 12/2002 | Haff et al. |
| 2003/0004950 A1 | 1/2003 | Wils et al. |

| Publication No. | Date | Inventor |
|---|---|---|
| 2003/0046586 A1 | 3/2003 | Bheemarasetti et al. |
| 2003/0046587 A1 | 3/2003 | Bheemarasetti et al. |
| 2003/0055962 A1 | 3/2003 | Freund et al. |
| 2003/0067874 A1 | 4/2003 | See et al. |
| 2003/0084165 A1* | 5/2003 | Kjellberg et al. ............ 709/227 |
| 2003/0131079 A1 | 7/2003 | Neale et al. |
| 2003/0131100 A1 | 7/2003 | Godon et al. |
| 2003/0135626 A1* | 7/2003 | Ray et al. .................... 709/228 |
| 2003/0154239 A1 | 8/2003 | Davis et al. |
| 2003/0154407 A1* | 8/2003 | Kato et al. .................. 713/201 |
| 2003/0163693 A1* | 8/2003 | Medvinsky ................. 713/169 |
| 2003/0172138 A1 | 9/2003 | McCormack et al. |
| 2003/0177389 A1 | 9/2003 | Albert et al. |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0188193 A1* | 10/2003 | Venkataramappa ......... 713/201 |
| 2003/0191799 A1 | 10/2003 | Araujo et al. |
| 2003/0195759 A1* | 10/2003 | Glassco et al. .................. 705/1 |
| 2003/0198189 A1 | 10/2003 | Roberts et al. |
| 2003/0200234 A1 | 10/2003 | Koppich et al. |
| 2003/0202480 A1 | 10/2003 | Swami |
| 2003/0212776 A1 | 11/2003 | Roberts et al. |
| 2003/0212817 A1 | 11/2003 | Matthews et al. |
| 2003/0223361 A1 | 12/2003 | Hussain et al. |
| 2003/0229718 A1 | 12/2003 | Tock et al. |
| 2003/0233541 A1* | 12/2003 | Fowler et al. ............... 713/155 |
| 2003/0233581 A1 | 12/2003 | Reshef et al. |
| 2004/0010601 A1 | 1/2004 | Afergan et al. |
| 2004/0010621 A1 | 1/2004 | Afergan et al. |
| 2004/0039827 A1 | 2/2004 | Thomas et al. |
| 2004/0049515 A1 | 3/2004 | Haff et al. |
| 2004/0073512 A1 | 4/2004 | Maung |
| 2004/0078621 A1 | 4/2004 | Talaugon et al. |
| 2004/0078772 A1 | 4/2004 | Balay et al. |
| 2004/0095934 A1 | 5/2004 | Cheng et al. |
| 2004/0107360 A1 | 6/2004 | Herrmann et al. |
| 2004/0111642 A1 | 6/2004 | Peles |
| 2004/0125756 A1* | 7/2004 | Lepore et al. ............... 370/261 |
| 2004/0139178 A1 | 7/2004 | Mendez et al. |
| 2004/0148505 A1* | 7/2004 | Qiu ............................. 713/175 |
| 2004/0158429 A1 | 8/2004 | Bary et al. |
| 2004/0162876 A1 | 8/2004 | Kohavi |
| 2004/0177247 A1 | 9/2004 | Peles |
| 2004/0210320 A1 | 10/2004 | Pandya |
| 2004/0210771 A1* | 10/2004 | Wood et al. ................. 713/201 |
| 2004/0215826 A1 | 10/2004 | Pfitzner |
| 2004/0250124 A1 | 12/2004 | Chesla et al. |
| 2004/0255154 A1 | 12/2004 | Kwan et al. |
| 2004/0258003 A1 | 12/2004 | Kokot et al. |
| 2005/0015601 A1* | 1/2005 | Tabi ............................ 713/182 |
| 2005/0021969 A1* | 1/2005 | Williams et al. ............ 713/176 |
| 2005/0025125 A1 | 2/2005 | Kwan |
| 2005/0050362 A1 | 3/2005 | Peles |
| 2005/0055570 A1 | 3/2005 | Kwan et al. |
| 2005/0063519 A1 | 3/2005 | James |
| 2005/0066163 A1* | 3/2005 | Ikenoya ....................... 713/156 |
| 2005/0071652 A1 | 3/2005 | de Jong |
| 2005/0074126 A1* | 4/2005 | Stanko ......................... 380/279 |
| 2005/0086206 A1 | 4/2005 | Balasubramanian et al. |
| 2005/0114653 A1* | 5/2005 | Sudia .......................... 713/158 |
| 2005/0132030 A1 | 6/2005 | Hopen et al. |
| 2005/0188215 A1 | 8/2005 | Shulman et al. |
| 2005/0198510 A1* | 9/2005 | Robert et al. ............... 713/175 |
| 2005/0251573 A1 | 11/2005 | Merkow et al. |
| 2005/0254652 A1 | 11/2005 | Engler et al. |
| 2005/0262063 A1 | 11/2005 | Conboy et al. |
| 2006/0004662 A1* | 1/2006 | Nadalin et al. ................ 705/50 |
| 2006/0015570 A1 | 1/2006 | Khemani et al. |
| 2006/0029016 A1 | 2/2006 | Peles |
| 2006/0041635 A1 | 2/2006 | Alexander et al. |
| 2006/0047951 A1* | 3/2006 | Reilly et al. ................. 713/158 |
| 2006/0050703 A1 | 3/2006 | Foss |
| 2006/0069912 A1 | 3/2006 | Zheng et al. |
| 2006/0072755 A1* | 4/2006 | Oskari ......................... 380/270 |
| 2006/0206931 A1 | 9/2006 | Dillaway et al. |
| 2007/0061871 A1 | 3/2007 | Simpkins et al. |
| 2007/0101418 A1* | 5/2007 | Wood et al. ..................... 726/8 |
| 2008/0086564 A1* | 4/2008 | Putman et al. .............. 709/227 |

FOREIGN PATENT DOCUMENTS

| | | |
|---|---|---|
| EP | 0 643 514 A2 | 3/1995 |
| EP | 0863453 | 9/1998 |
| EP | 0927921 | 7/1999 |
| EP | 1047239 | 10/2000 |
| EP | 1049306 | 11/2000 |
| EP | 1289225 | 3/2003 |
| EP | 1330705 | 7/2003 |
| EP | 1364296 | 11/2003 |
| EP | 1388812 | 2/2004 |
| JP | 6-332782 | 12/1994 |
| JP | 2000307650 | 11/2000 |
| JP | 2004509539 | 3/2004 |
| WO | WO-99/60462 | 11/1999 |
| WO | WO-0051290 | 8/2000 |
| WO | WO 00/62507 | 10/2000 |
| WO | WO-0137517 | 5/2001 |
| WO | WO-0175632 | 10/2001 |
| WO | WO-0223362 | 3/2002 |
| WO | WO-02/39221 | 5/2002 |
| WO | WO-02/39260 | 5/2002 |
| WO | WO-02/39261 | 5/2002 |
| WO | WO-02/39262 | 5/2002 |
| WO | WO-02/39263 | 5/2002 |
| WO | WO-02/39264 | 5/2002 |
| WO | WO-02/39275 | 5/2002 |
| WO | WO-02/39276 | 5/2002 |
| WO | WO-02/39301 | 5/2002 |
| WO | WO-02/39666 | 5/2002 |
| WO | WO-02/39693 | 5/2002 |
| WO | WO-02/39695 | 5/2002 |
| WO | WO-02/41575 | 5/2002 |
| WO | WO-02/42922 | 5/2002 |
| WO | WO-02/43320 | 5/2002 |
| WO | WO-02/43364 | 5/2002 |
| WO | WO-0237267 | 5/2002 |
| WO | WO-02/46925 | 6/2002 |
| WO | WO-02/46944 | 6/2002 |
| WO | WO-02/46945 | 6/2002 |
| WO | WO-02/58349 | 7/2002 |
| WO | WO-02/069604 | 9/2002 |
| WO | WO-02/093369 | 11/2002 |
| WO | WO-02/103521 | 12/2002 |
| WO | WO-2004003879 | 1/2004 |
| WO | WO-2004006041 | 1/2004 |
| WO | WO-2004017601 | 2/2004 |
| WO | WO 2004/049672 | 6/2004 |
| WO | WO-2004051964 | 6/2004 |
| WO | WO-2004066278 | 8/2004 |
| WO | WO-2004090672 | 10/2004 |
| WO | WO-2005024550 | 3/2005 |
| WO | WO-2005024567 | 3/2005 |
| WO | WO-2005024665 | 3/2005 |
| WO | WO-2005029313 | 3/2005 |
| WO | WO-2005029363 | 3/2005 |
| WO | WO-2005074232 | 8/2005 |
| WO | WO-2005084232 | 9/2005 |
| WO | WO-2006012533 | 2/2006 |
| WO | WO-2006017388 | 2/2006 |

OTHER PUBLICATIONS

International Searching Authority, International Search Report related to PCT/US05/028606, mailed Feb. 24, 2006 (10 pages).
International Searching Authority, Written Opinion related to PCT/US05/028606, mailed Feb. 24, 2006 (9 pages).

Sirbu, et al., "Distributed authentication in Kerberos using public key cryptograph," *Proc. 1997 Symposium on Network and Distributed Systems Security* (SNDSS'97), 134-141, IEEE CS Press, 1997.

Perkins et al., *Route Optimization in Mobile IP*, Internet draft, work in progress, Sep. 2001.

Simon et al., "A Cryptographic Protocol to Obtain Secure Communications in Extended Ethernet Environment," *Proc. 17th Conf. on Local Computer Networks*, 254-261, IEEE CS Press, 1992.

Neuman et al., *The Kerberos Network Authentication Service (V5)*, Internet draft, work in progress, Sep. 2004.

Non Final Office Action dated Jun. 27, 2008. U.S. Appl. No. 10/711,730.

Non Final Office Action dated Jun. 17, 2008. U.S. Appl. No. 10/711,731.

Administrator's Guide, Citrix NFuse Classic. Version 1.7, Citrix Systems Inc.

Citrix MetaFrame XP Security Standards and Deployment Scenarios. MetaFrame XP Server for Windows with Feature Release 3. Citrix Systems Inc.

Advisory action for U.S. Appl. No. 10/711,731, dated Jan. 21, 2009 (CTX-123).

Anonymous, "Health Canada Takes Its Network Pulse," Communications News, 48, Oct. 2001, available at http://www.findarticles.com/p/articles/mi_mODUD/is_5_23/ai_86039142.

Anonymous, "Multiple Platforms Bring Multiple Challenges," Communications News, 56, Oct. 2001, available at http://www.findarticles.com/p/articles/mi_mOCMN/is_10_38/ai_79370488.

Anonymous, "Remote Access," Secure Computing, 47-60, Oct. 1997.

Anonymous: "Citrix Metaframe 1.8—Backgrounder", Internet Publication, Apr. 24, 1999 (1999-04-240, XP002217973.

Antonoff, M., "Writing in a Spreadsheet," Personal Computing, 51-54, 1987.

Ao et al., "A Hierarchical Policy Specification Language, and Enforcement Mechanism, for Governing Digital Enterprises", 3rd IEEE International Workshop on Policies for Distributed Systems and Networks (Policy 2002), 38-49, IEEE CS Press, 2002, available at http://www.cs.rutgers.edu/~tdnguyen/pubs/ao-policy-2002.pdf.

Back et al., "Contracts, Games and Refinement," TUCS Technical Report No. 138, Turku Centre for Computer Science, 1-15, Nov. 1997.

Beers, C., "McAfee Shores Up Your Defenses," Network Computing, 38, Jun. 2003, available at http://www.networkcomputing.com/1412/1412sp3.html.

Bird, T., "Reduce the Threat from Computers," Communications News, 36, 38-39, Mar. 2005, available at http://www.comnews.com/stories/articles/0305/0305reduce_threat.htm.

Brekne, T., "Mobile Agents and (In-)Security," Telektronikk, 34-46, 2000.

Carvalho et al., "Supporting Flexible Data Feeds in Dynamic Sensor Grids Through Mobile Agents," Lecture Notes in Computer Science vol. 2535, Proc. 6th International Conference on Mobile Agents (MA 2002), 171-185, Springer-Verlag, Germany, 2002.

Cheng et al., "Adjusting the Autonomy of Collections of Agents in Multiagent Systems," Lecture Notes in Computer Science vol. 3501, 33-37, Advances in Artificial Intelligence: Proc. 18th Conference of the Canadian Society for Computational Studies of Intelligence (Canadian AI 2005), Springer-Verlag, Germany, 2005.

Citrix Metaframe XPa for windows 2002.

Corradi et al., "Policy-Driven Management of Agent Systems," Lecture Notes in Computer Science vol. 1995, Policies for Distributed Systems and Networks: Proc. International Workshop (Policy 2001), 214-229, Springer-Verlag, Germany, 2001.

Dulay et al., "A Policy Deployment Model for the Ponder Language," Proc. IEEE/IFIP International Symposium on Integrated Network Management (IM 2001), 529-543, Seattle, Washington, USA, IEEE Press, 2001.

EP examination report for appl 07115382.9 dated May 23, 2008 (CTX-098EP).

Esposito, A. et al., "Integrating Concurrency Control and Distributed Data into Workflow Frameworks: an Actor Model Perspective," 2000 IEEE International Conference on Systems, Man, and Cybernetics, vol. 3, 2110-2114, IEEE Press, 2000.

European Patent Office Examination Report dated Aug. 17, 2007 for Application No. 05798714. 3 pages.

European Search Report for European Application No. 08 00 9196, date of completion Oct. 23, 2008. (7 pages).

Exam Report for EP appln 05798714.1 dated May 19, 2009 (CTX-123EP).

Feldman, M., "Enterprise Wrappers for Information Assurance," Proc. DARPA Information Survivability Conference and Exposition (DISCEX '03), IEEE Press, 2003.

Fratto, M., "Hammering Out a Secure Framework," Network Computing, 79-80, 82, 84-87, 2000, available at http://www.networkcomputing.com/1101/1101f3.html.

Funk Software, "Funk Software's Endpoint Assurance Solution. The Secure Product Foundation for Endpoint Integrity," 2005, available at: http://www.juniper.net/welcome_funk.html.

Graniero, P.A. et al., "Investigating the Role of Fuzzy Sets in a Spatial Modeling Framework," Proc. 9th IFSA World Congress and 20th NAFIPS International Conference, 2370-2375, IEEE Press 2001.

Guy III, E.T., "An Introduction to the CAD Framework Initiative," Electro 1992 Conference Record, 78-83, Massachusetts, May 1992.

International Searching Authority, "International Search Report," PCT Application No. PCT/ US05/028605, mailed on Jan. 18, 2006, 7 pgs.

International Searching Authority, "International Search Report," PCT Application No. PCT/ US05/028607, mailed on Mar. 31, 2006, 10 pgs.

International Searching Authority, "Partial International Annexed to Invitation to Pay fees," PCT Application No. PCT/ US05/028607, mailed on Dec. 14, 2005, 7 pgs.

International Searching Authority, "Written Opinion," PCT Application No. PCT/ US05/028605, mailed Jan. 18, 2006, 7 pgs.

International Searching Authority, "Written Opinion," PCT Application No. PCT/ US05/028607, mailed on Mar. 31, 2006, 10 pgs.

Jin, H. et al., "A Distributed Dynamic µFirewall Architecture With Mobile Agents and KeyNote Trust Management System," Lecture Notes in Computer Science, vol. 2513, Proc. 4th International Conference on Information and Communications Security, (ICICS 2002), 13-24, Springer-Verlag, Germany, 2002.

Jun, M. et al., "Application of Mobile Scanning Agent in the Network Security," J. of Systems Engineering and Electronics, 15(3): 371-376, 2004.

Juniper Networks NetScreen-SA 5000 Series. Spec Sheet Access Appliances, Juniper Networks, Sunnyvale, CA., 4 pages.

Juniper Networks, "Juniper Networks Infranet Controllers Provide Unified Access Control for all Users throughout Your Network," (Oct. 2005), available at: http://www.juniper.net/products/ua/dsheet/100137.pdf.

Keromytis, A.D. et al., "Transparent Network Security Policy Enforcement," Proc. USENIX Technical Conference, 215-225, San Diego, CA, USA, 2000.

Kim, S.C. et al., "Study of Security Management System Based on Client/ Server Model," 1403-1408, IEEE Press, 1999.

Klein, D., "Developing Applications with a UIMS," Proc. USENIX Applications Development Symposium, 37-56, 1994.

Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.

Krief, F. et al., "An Intelligent Policy-Based Networking Environment for Dynamic Negotiation, Provisioning and Control of QoS," IFIP TC6/WG6.2 & WG6.7 Conference on Network Control and Engineering for QoS, Security and Mobility, (Net-Con 2002), 285-290, Kluwer Academic Publishers, 2002.

Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.

Law, K.L.E. et al., "Policy-Based Management With Active Networks," IFIP TC6/WG6.2 & WG6.7 Conference on Network Control and Engineering for QoS, Security and Mobility, (Net-Con 2002), 129-140, Kluwer Academic Publishers, 2002.

Law, K.L.E. et al., "UPM: Unified Policy-Based Network Management," Proc. SPIE, (ITCom 2001), vol. 4523, 326-337, Denver, CO, USA, 2001.

Lee, D.W. et al., "Managing Fault Tolerance Information in Multi-Agents Based Distributed Systems," Lecture Notes in Computer Science, vol. 2690, Intelligent Data Engineering and Automated Learning, (Ideal 2003), 104-108, Springer-Verlag, Germany, 2003.

Maes, S. et al., "Identifiability of Causal Effects in a Multi-Agent Causal Model," IEEE/WIC International Conference on Intelligent Agent Technology, (IAT'03), 605, IEEE Press, 2003.

Mahler, R.P. et al. "Technologies for Unified Collection and Control of UCAVs," Proc. Of SPIE vol. 4729, 90-101, 2002.

Matsuura, S. et al., "An Extension of ECA Architecture and its Application to HTML Document Browsing," IEEE International Conference on Systems, Man, and Cybernetics, vol. 1, 738-743, IEEE Press 1999.

Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.

Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.

Molta, D., "Odyssey Makes Wireless LANs a Safe Trip," Networking Computing, 24, 26, 2002, available at http://www.networkcomputing.com/1311/1311sp2.html.

Montanari, R. et al., "Context-Based Security Management for Multi-Agent Systems," Proc. Second IEEE Symposium on Multi-Agent Security and Survivability (MAS&S 2005), IEEE Press, 2005.

Neuman et al., the Kerberos Network Authentication Service (V5), Internet draft, work in progress, Sep. 2004.

Non Final Office Action dated Jun. 6, 2008. U.S. Appl. No. 10/711,729.

Office action for U.S. Appl. No. 10/711,731 dated Apr. 17, 2009 (CTX-123).

Office action for U.S. Appl. No. 10/711,731 dated Jun. 17, 2008 (CTX-123).

Office action for U.S. Appl. No. 10/711,731 dated Oct. 20, 2008 (CTX-123).

Office Action for U.S. Appl. No. 10/711,730 dated Apr. 28, 2009 (CTX-118).

Office Action for U.S. Appl. No. 10/711,730 dated Jun. 27, 2008 (CTX-118).

Office Action for U.S. Appl. No. 10/711,730 dated Dec. 11, 2008 (CTX-118).

Office Action for U.S. Appl. No. 10/956,764 dated Oct. 8, 2008 (CTX-121).

Office action for U.S. Appl. No. 11/272,598 dated Oct. 7, 2008 (CTX-098DV).

Office Action for AU appln 2005292566 dated May 6, 2009 (CTX-123AU).

Office Action for CN appln 2005800470611 dated Jul. 17, 2009 (CTX-098CN).

Office Action for U.S. Appl. No. 10/711,729 dated Sep. 4, 2009 (CTX-124).

Office Action for U.S. Appl. No. 10/711,731 dated Sep. 21, 2009 (CTX-123).

Office Action for U.S. Appl. No. 10/956,764 dated Jul. 7, 2009 (CTX-121).

Office Action for U.S. Appl. No. 11/255,311 dated Jun. 23, 2009 (CTX-096).

Office Action for U.S. Appl. No. 11/272,598 dated Jul. 23, 2009 (CTX-098DV).

Page, S.E., "Self Organization and Coordination," Computational Economics, vol. 18, 25-48, Kluwer Academic Publishers, 2001.

Palmer, D. et al., "Decentralized Cooperative Auction for Multiple Agent Task Allocation Using Synchronized Random Number Generators," Proc. IEEE/RSJ International Conference on Intelligent Robots and Systems, 1963-1968, IEEE Press, 2003.

Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.

Randic, M. et al., "Object by Value Transfer Mechanisms for Obligation Policy Enforcement Object Loading," Proc. 12th IEEE Mediterranean Electrotechnical Conference, (Melecon 2004), IEEE Press, 2004.

Restriction requirement for U.S. Appl. No. 10/956,764 dated Jun. 1, 2009 (CTX-121).

Suri, N. et al., "DAML-Based Policy Enforcement for Semantic Data Transformation and Filtering in Multi-Agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.

Suri, N. et al., "Enforcement of Communications Policies in Software Agent Systems through Mobile Code," Proc. 4th International Workshop on Policies for Distributed Systems and Networks, (Policy'03), 247, IEEE Press, 2003.

Takahaski, K. et al., "Integrating Heterogeneous and Distributed Information by Linking it to Structured Information as an 'Information Integration Directory'," J81-D-1(5): 443-450, 1998.

Tierling, E.: "Gezaehmtes Monster", CT Magazin Fuer Computer TEchnik, Verlag Heinz Heise GMBH., Hannover, DE, No. 10, 1998, pp. 226-228, 230, 23, XP000740851, ISSN: 0724-8679.

Uszok, A. et al., "KAoS Policy and Domain Services: Toward a Description-Logic Approach to Policy Representation, Deconfliction, and Enforcement," Proc. 4th International Workshop on Policies for Distributed Systems and Networks, (Policy'03), 93, IEEE Press, 2003.

Wang, D. et al., "Study oOn Soap-Based Mobile Agent Techniques," Lecture Notes in Computer Science, vol. 2480, Proc. First International Conference on Engineering and Deployment of Cooperative Information Systems, 208-219, Springer-Verlag, Germany, 2002.

Wittner, O. and Helvik, B.E., "Distributed Soft Policy Enforcement by Swarm Intelligence; Application to Loadsharing and Protection," Ann. Telecommun., vol. 59, No. 1-2, 10-24, 2004.

Xia, H. et al., "Using Secure Coprocessors to Protect Access to Enterprise Networks," Lecture Notes in Computer Science, vol. 3462, Proc. International IFIP-TC6 Networking Conference, (Networking 2005), Springer-Verlag, Germany, 2005, available at http://www.cs.pitt.edu/~jcb/papers/net2005.pdf.

Xu, Y. et al., "An Agent-Based Data Collection Architecture for Distributed Simulations," Int'l J. of Modelling and Simulation, 24(2), 55-64, 2004.

Yang, K. et al., "Service and Network Management Middleware for Cooperative Information Systems through Policies and Mobile Agents," Lecture Notes in Computer Science, vol. 2480, Proc. First International Conference on Engineering and Deployment of Cooperative Information Systems, 232-246, Springer-Verlag, Germany, 2002.

Yang, S., "Setting up a Secure Public Workstation," "Iols '99: Proceedings of the 14th Integrated Online Library Systems Meeting May 19-20, 1999,", May 1998.

Yocom, B., et al., "A First Look at Wireless Security Products," Business Comm. Review, 36-48, Oct. 2003.

Yu, Y. et al., "Quality of Service Policy Control in Virtual Private Networks," Proc. Of SPIE, vol. 5282, 1055-1060, 2003.

Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.

Allison, Bridget et al., "File System Security: Secure Network Data Sharing for NT and UNIX" in Network Appliance, Inc. Tech Library pp. 16 pgs., Jan. 1, 1998.

* cited by examiner

METHOD AND APPARATUS FOR ASSOCIATING TICKETS IN A TICKET HIERARCHY

FIELD OF THE INVENTION

The present invention relates to a method and apparatus for managing tickets and, in particular, to a method and apparatus for associating session tickets allowing associated tickets to be managed as a group.

BACKGROUND OF THE INVENTION

Conventionally, when users on a client system request access to a resource, a process exists for providing the users with tickets associated with that resource. However, a user may initiate more than one resource request from the same client system and may receive more than one ticket. Management of the user tickets may grow unwieldy and frustrating, especially from a user perspective. For example, a user may focus on a particular session to the exclusion of others and must then re-authenticate itself for the re-issuance of an expired session ticket. A method for simultaneously managing all of the tickets associated with a particular user is desirable.

BRIEF SUMMARY OF THE INVENTION

The present invention relates to a method and apparatus for associating renewable session tickets. In one aspect, the invention relates to a method and apparatus for associating session tickets and includes a ticketing authority server. The ticketing authority server receives a ticket generation request and information about a client node. It identifies a master session ticket associated in a storage element with the client node. The ticketing authority server then generates a derivative session ticket for the client node and associates the derivative session ticket with the master session ticket. Finally, the ticketing authority server stores information about the client node and the derivative session ticket in the storage element.

In another aspect, the invention relates to a method and apparatus for renewing associated session tickets. The ticketing authority server receives a session ticket renewal request and a session ticket and retrieves the session associated with the received session ticket. The ticketing authority server then renews the session expiration date for the received session ticket and retrieves the master session ticket associated with the received session ticket. The ticketing authority server renews the session expiration date of the master session ticket and retrieves any derivative session ticket associated with the master session ticket. Finally, the ticketing authority server renews the session expiration date of the derivative session ticket associated with the master session ticket.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The illustrative embodiment of the present invention is applicable to a distributed networking environment where a remote user requests access to content. Prior to discussing the specifics of the present invention, it may be helpful to discuss some of the network environments in which the illustrative embodiment of the present invention may be employed.

Figure 1A:
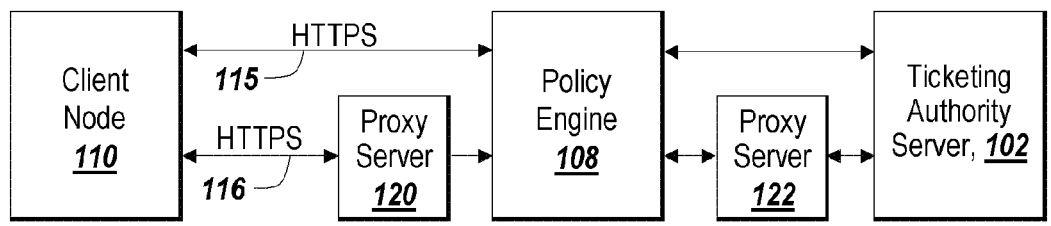
FIG. 1A is a block diagram of an environment suitable for practicing the illustrative embodiment of the present invention.
Figure 1B:
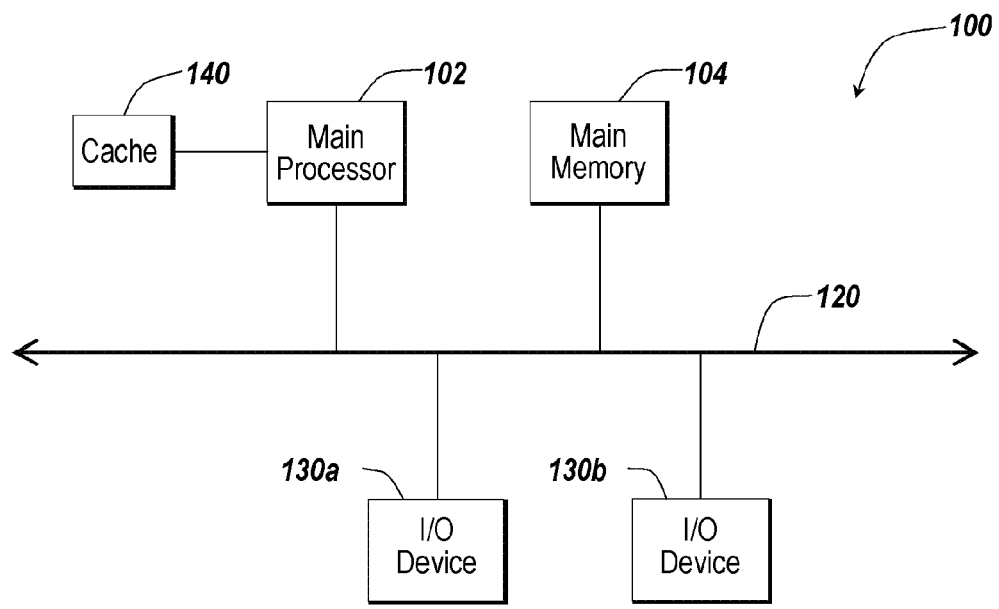
FIGS. 1B and 1C are block diagrams depicting embodiments of computers useful in connection with the present invention.
Figure 1C:
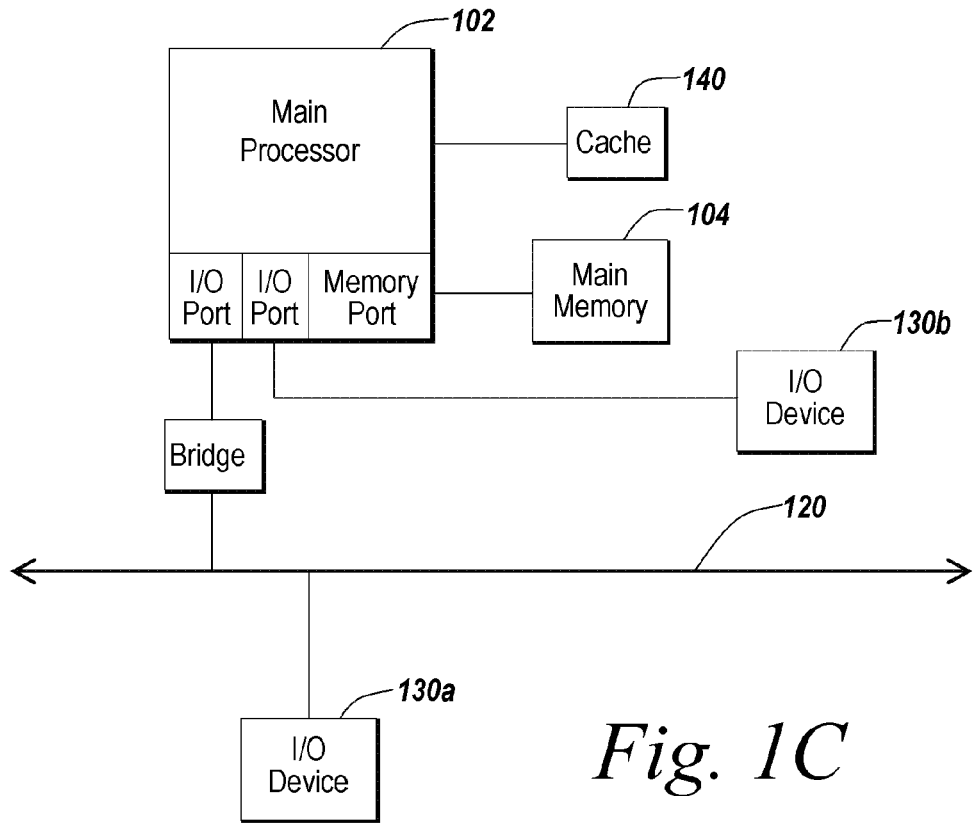

FIG. 1A is a block diagram of an environment suitable for practicing the illustrative embodiment of the present invention. In many embodiments, the ticketing authority server 102, the policy engine 108 and client node 110 are provided as personal computer or computer servers, of the sort manufactured by the Hewlett-Packard Corporation of Palo Alto, Calif. or the Dell Corporation of Round Rock, Tex. FIGS. 1B and 1C depict block diagrams of a typical computer 100 useful as the client node 110 or the policy engine 108 in those embodiments. As shown in FIGS. 1B and 1C, each computer 100 includes a central processing unit 102, and a main memory unit 104. Each computer 100 may also include other optional elements, such as one or more input/output devices 130a-130n (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the PENTIUM, PENTIUM PRO, the PENTIUM II, the CELERON, or XEON processor, all of which are manufactured by Intel Corporation of Mountain View, Calif.; the 68000, the 68010, the 68020, the 68030, the 68040, the POWERPC 601, the POWERPC 604, the POWERPC 604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the CRUSOE TM5800, the CRUSOE TM5600, the CRUSOE TM5500, the CRUSOE TM5400, the EFFICEON TM8600, the EFFICEON TM8300, or the EFFICEON TM8620 processor, manufactured by Transmeta Corporation of Santa Clara, Calif.; the RS/6000 processor, the RS64, the RS 6411, the P2SC, the POWERS, the RS64 III, the POWER3-II, the RS 64 IV, the POWER4, the POWER4+, the POWER5, or the POWER6 processor, all of which are manufactured by International Business Machines of White Plains, N.Y.; or the AMD OPTERON, the AMD ATHLON 64 FX, the AMD ATHLON, or the AMD DURON processor, manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch- Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 1B, the processor 102 communicates with main memory 104 via a system bus 120 (described in more detail below). FIG. 1C depicts an embodiment of a computer system 100 in which the processor communicates directly with main memory 104 via a memory port. For example, in FIG. 1C, the main memory 104 may be DRDRAM.

FIG. 1B and FIG. 1C depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1B, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1C depicts an embodiment of a computer system 100 in which the main processor 102 communicates directly with I/O device 130b via HyperTransport, Rapid I/O, or InfiniBand. FIG. 1C also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an APPLE Desktop Bus, an RS-232 serial connection, a SCSI bus, a FIREWIRE bus, a FIREWIRE 800 bus, an Ethernet bus, an APPLETALK bus, a Gigabit Ethernet bus, an Asynchronous Transfer Mode bus, a HIPPI bus, a Super HIPPI bus, a SERIALPLUS bus, a SCI/LAMP bus, a Fibre channel bus, or a Serial Attached small computer system interface bus.

General-purpose desktop computers of the sort depicted in FIG. 1 B and FIG. 1 C typically operate under the control of operating systems, which control scheduling of tasks and access to system resources. Typical operating systems include: MICROSOFT WINDOWS, manufactured by Microsoft Corp. of Redmond, Wash.; MAC OS®, manufactured by Apple Computer of Cupertino, Calif.; OS/2, manufactured by International Business Machines of Armonk, N.Y.; and LINUX, a freely-available operating system distributed by Caldera Corp. of Salt Lake City, Utah, among others.

The client node 110 may be any personal computer (e.g., 286, 386, 486, PENTIUM, PENTIUM II, MACINTOSH computer), WINDOWS-based terminal, network computer, wireless device, information appliance, RISC POWERPC®, X-device, workstation, mini computer, main frame computer, personal digital assistant, or other computing device that has a windows-based desktop and sufficient persistent storage for executing a small, display presentation program. The display presentation program uses commands and data sent to it across communication channels to render a graphical display. Windows-oriented platforms supported by the client node 110 can include, without limitation, WINDOWS 3.x, WINDOWS 95, WINDOWS 98, WINDOWS NT 3.51, WINDOWS NT 4.0, WINDOWS 2000, WINDOWS CE, MAC/OS, JAVA, and UNIX. The client node 110 can include a visual display device (e.g., a computer monitor), a data entry device (e.g., a keyboard), persistent or volatile storage (e.g., computer memory) for storing downloaded application programs, a processor, and a mouse. Execution of a small, display presentation program allows the client node 110 to participate in a distributed computer system model (i.e., a server-based computing model).

For embodiments in which the client node 110 is a mobile device, the device may be a JAVA-enabled cellular telephone, such as the i50sx, i55sr, i58sr, i85s, i88s, i90c, i95cl , or the iml 1000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the client node 1 10 is mobile, it may be a personal digital assistant (PDA) operating under control of the PALM OS operating system, such as the TUNGSTEN W, the VII, the VIIx, the i705, all of which are manufactured by PalmOne, Inc. of Milpitas, Calif. In further embodiments, the client node 110 may be a personal digital assistant (PDA) operating under control of the POCKET PC operating system, such as the IPAQ® 4155, IPAQ® 5555, IPAQ® 1945, IPAQ® 2215, and IPAQ® 4255, all of which manufactured by Hewlett-Packard Corporation of Palo Alto, Calif., the ViewSonic V36, manufactured by ViewSonic of Walnut, Calif., or the Toshiba POCKETPC® e405, manufactured by Toshiba America, Inc. of New York, N.Y. In still other embodiments, the client node is a combination PDA/telephone device such as the TREO 180, TREO 270 or TREO 600, all of which are manufactured by PalmOne, Inc. of Milpitas, Calif. In still further embodiments, the client node 102 is a cellular telephone that operates under control of the POCKET PC operating system, such as the MPX200, manufactured by Motorola Corp. A user of the client node 110 may communicate with the other network elements using protocols such as the depicted Hypertext Transport Protocol Secure (HTTPS) request 115, or an HTTP (Hypertext Transport Protocol) or FTP (File Transport Protocol) request.

Figure 1D:
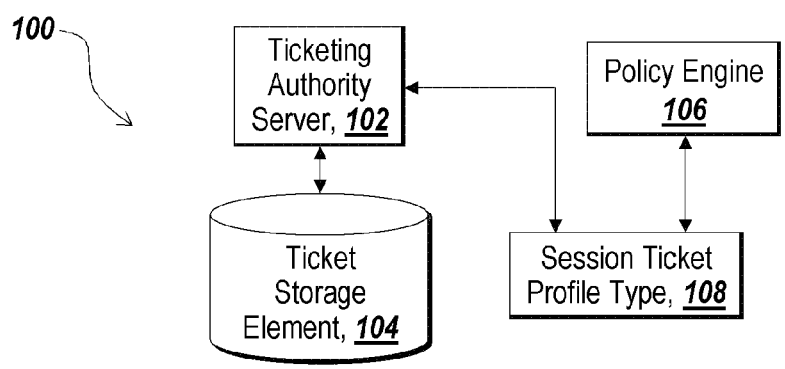
FIG. 1D is a block diagram of an embodiment of a computer network for associating session tickets.

FIG. 1D depicts one embodiment of a ticket system 100 constructed in accordance with the invention is depicted, which includes a ticketing authority server 102, a ticket storage element 104, a policy engine 106, and a session ticket profile type 108. Although only one ticketing authority server 102, ticket storage element 104, and policy engine 106, are depicted in the embodiment shown in FIG. 1D, it should be understood that the system may provide multiple ones of any or each of those components. In some of these embodiments, the servers may be geographically dispersed. In some embodiments, the ticketing authority server 102 may further comprise the ticket storage element 104. In other embodiments, the policy engine 106 may further comprise the ticketing authority server 102. In still other embodiments, the policy engine 106 may comprise the ticketing authority server 102 and the ticket storage element 104.

In brief overview, the ticketing authority server 102 associates each session ticket generated for a client node with a master session ticket to manage session tickets and the entries in the ticket storage element 104 to which they refer. In some embodiments, the ticketing authority server 102 may comprise application software executing on a general-purpose computer, such as the ones described above in connection with FIG. 1B and FIG. 1C. In other embodiments, the ticketing authority server 102 may comprise special purpose hardware. In still other embodiments, the ticketing authority server 102 may be a process executing on a policy engine 108.

In more detail, the ticketing authority server 102 receives a ticket generation request and information about a client node. In some embodiments, the ticketing authority server 102 receives the ticket generation request from a proxy server. In other embodiments, the ticketing authority server 102 receives the ticket generation request from an authentication server. In those embodiments, the authentication server may request a specific type of session ticket based upon an access control decision made by the authentication server.

In some embodiments, the ticketing authority server 102 receives the ticket generation request over a network connection. The network can be a local area network (LAN), a metropolitan area network (MAN), or a wide area network (WAN) such as the Internet. The client node 102 and the policy engine 106 may connect to a network through a variety of connections including standard telephone lines, LAN or WAN links (e.g., T1, T3, 56 kb, X.25), broadband connections (ISDN, Frame Relay, ATM), and wireless connections. Connections between the client node 102 and the policy engine 106 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

In one embodiment, a session ticket is a reference to an entry in a storage element 104. In one embodiment, the session ticket comprises a random number. In other embodiments, the session ticket is a hash of client node information.

In one embodiment, the entry in the storage element 104 may include, without limitation, an identifier for a master session ticket, an identifier for a derivative session ticket, a session profile type, and client node information. In one embodiment, the storage element 104 is a database. In another embodiment, the storage element is a data structure. In yet another embodiment, the storage element 104 is a file. In other embodiments, the storage element 104 is a relational database.

In one embodiment, the ticketing authority server 102 receives information about the client node requiring the session ticket. The client node information may include, without limitation, the user name of the user accessing the client node, the network domain on which the client node resides, and the type of session initiated.

The ticketing authority server 102 identifies a master session ticket associated in the ticket storage element 104 with the client node and generates a derivative session ticket for the client node. In one embodiment, the ticketing authority server 102 identifies the master session ticket by using the client information in the ticket storage element 104 query to determine whether any master session tickets exist. In one embodiment, the ticket storage element 104 stores an entry for each master session tickets including, without limitation the client node identifier, session profile type, an identifier for the master session ticket and the identifier of each derivative session ticket associated with the master session ticket. In this embodiment, the ticketing authority server 102 associates the derivative session ticket with the master session ticket by adding an identifier for the derivative session ticket in the ticket storage element 104 entry for the master session ticket.

In another embodiment, the ticketing authority server 102 determines that the client node has not received a master session ticket. In this embodiment, the ticketing authority server 102 generates a master session ticket for the client. The ticketing authority server 102 issues the session ticket and stores in the ticket storage element 104 the received client node information and an identifier for the master session ticket.

Finally, the ticketing authority server 102 stores information about the client node and the derivative session ticket in the ticket storage element 104. In one embodiment, the ticketing authority server 102 writes an entry to the ticket storage element 104 storing the received client node information, a session profile type, an identifier for the derivative session ticket, and an identifier for the associated master session ticket in the ticket storage element 104.

Figure 2:
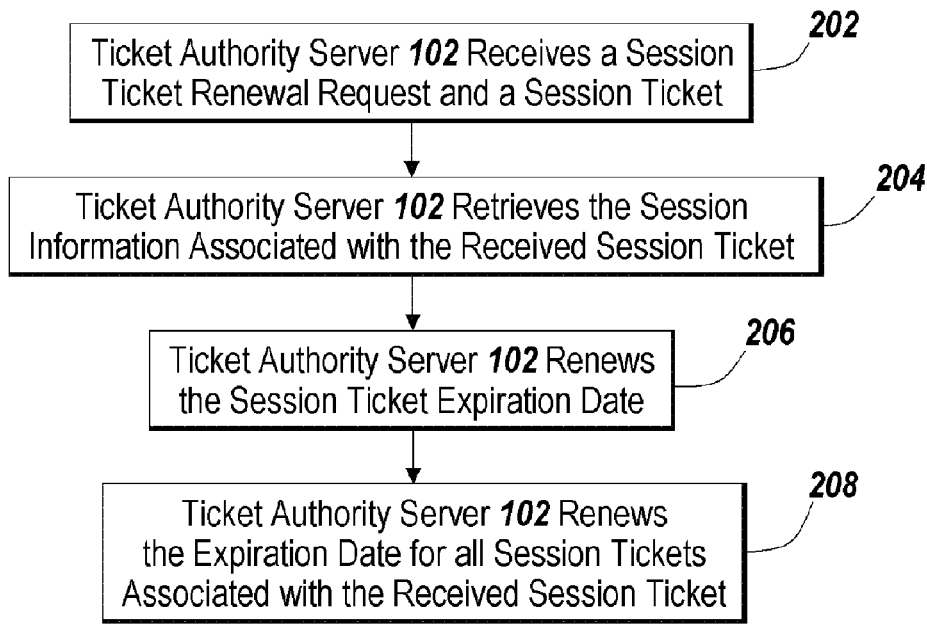
FIG. 2 is a flow diagram depicting one embodiment of the steps taken by a ticketing authority server to renew each session ticket generated for a client node and associated with a particular master session ticket.

Referring now to FIG. 2, a flow diagram depicts one embodiment of the steps taken by the ticketing authority server 102 to renew associated session tickets. The ticketing authority server 102 receives a request for session ticket renewal and a session ticket (Step 202) and renews the expiration date for that session ticket and all session tickets associated with that received session ticket.

The ticketing authority server 102 retrieves the session associated with the received session ticket (Step 204). In one embodiment, the ticketing authority server 102 queries the ticket storage element 104 to retrieve the relevant session information. In this embodiment, the session ticket includes the identifiers needed to retrieve the session information.

The ticket server 102 renews the expiration date for the received session ticket (Step 206). In some embodiments, the expiration date is part of a session profile type. In other embodiments, the expiration date may be an entry in the ticket storage element 104.

The ticketing authority server 102 then renews the expiration dates for all session tickets associated with the received session ticket (Step 208). In one embodiment, the ticketing authority server 102 retrieves the master session ticket associated with the received session ticket. In some embodiments, the ticketing authority server 102 retrieves the master session ticket from the ticket storage element 104 using the session ticket received with the renewal request.

In one embodiment, the ticketing authority server 102 then retrieves the derivative session tickets associated with the received session ticket. In some embodiments, the ticketing authority server 102 retrieves the derivative session tickets from the ticket storage element 104 by first retrieving the master session ticket and then querying the ticket storage element 104 for derivative session tickets associated with the master session ticket.

In one embodiment, a network element providing a resource to the client node may request the master session ticket from the client node. In this embodiment, the network element periodically requests from the ticketing authority server 102 the expiration date associated with the master session ticket. Additionally, in this embodiment, the network element monitors the client node level of activity periodically. Before the master session ticket expires, if the client node has not idled, the network element requests, on behalf of the client node, that the ticketing authority server 102 renew the master session ticket and the related derivative session ticket or tickets.

In an example of this embodiment, the client node receives a renewable master session ticket and receives two renewable derivative session tickets. In some embodiments, one derivative session is, for example, a connection using a presentation-layer protocol such as the Independent Computing Architecture (ICA) protocol, available from Citrix Systems, Inc. of Fort Lauderdale, Fla., or the Remote Desktop Protocol (RDP), manufactured by Microsoft Corporation. In other embodiments, the derivative session is a connection using a presentation-layer protocol wrapped in a higher protocol.

The client node remains active in one such derivative session but becomes idle in the other derivative session ticket and in the master session ticket. The network element managing the ICA session determines that the idle derivative session has an imminent expiration date. The network element requests session ticket renewal for the derivative and master session tickets since the client remains active in the ICA session. The ticketing authority server 102 verifies the validity of each ticket and that each session ticket profile type allows renewal of the session ticket. The ticketing authority server 102 then renews all the session tickets for that client node.

Figure 3:
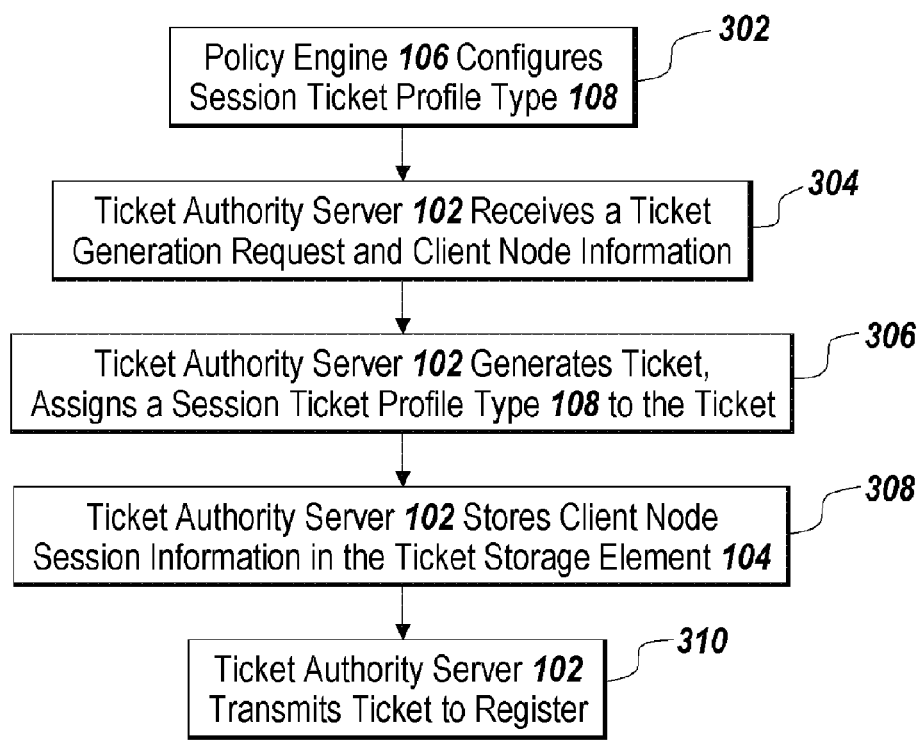
FIG. 3 is a flow diagram depicting one embodiment of the steps taken by a ticketing authority server and a policy engine to define and assign session profile types for each session ticket generated for a client node.

Referring now to FIG. 3, a flow diagram depicts one embodiment of the steps taken by the ticketing authority server 102 and the policy engine 106 to define and assign session profile types 108 for session tickets. In brief overview, the policy engine 106 configures at least one session profile type 108 and the ticketing authority server 102 assigns a session profile type 108 to each session ticket it generates.

In more detail, the policy engine 106 configures at least one session profile type 108. In one embodiment, the session profile type comprises configurable parameters. In one embodiment, one configurable parameter defines session lifetimes. In this embodiment, the session profile type 108 defines an expiration date for the session ticket and the session expires when the session ticket expires.

In other embodiments, one configurable parameter defines session failure reconnection rights. In one of these embodiments, a session failure reconnection right allows the session ticket to be a multiuse session ticket. In this embodiment, an idle timer controls the session lifetime.

In another of these embodiments, a session failure reconnection right allows the session ticket to be renewed. In this embodiment, the ticketing authority server 102 issues both a derivative session ticket and a reconnect session ticket. When the derivative session ticket expires, the client node may use the reconnect session to renew the derivative session ticket. In this embodiment, a separate idle timer monitors the length of time that passes between expiration and the presentation of the reconnect session ticket. If an unacceptable amount of time passes, the ticketing authority server 102 rejects the reconnect session ticket.

In another of these embodiments, a session failure reconnection right allows the session ticket to be used only once. In this embodiment, the ticketing authority server 102 will not renew this single use session ticket. Upon expiration of the session ticket, the session also expires and may not be renewed.

In another embodiment, the session profile type 108 defines the authorization credentials required from the client node for a session ticket to issue. In some embodiments, the authorization credentials include a number of types of authentication information, including without limitation, user names, client names, client addresses, passwords, PINs, voice samples, one-time passcodes, biometric data, digital certificates, etc. and combinations thereof.

In one embodiment, the policy engine 106 defines which of the rights are available for a particular session profile type 108 (Step 302). When the ticketing authority server 102 generates a session ticket, it uses the client node information to determine the session profile type 108 to assign to the session ticket (Steps 304 and 306). In one embodiment, the session profile type 108 grants differing session access rights for each session ticket the client node obtains, but the client node need only authenticate itself one time. This embodiment allows the client node to avoid multiple authentication procedures while enabling differing levels of access for various session types. Finally, the ticketing authority server 102 stores client node information in the ticket storage element 104 (Step 308) and transmits the issued session ticket to the originator of the ticket generation request (Step 310).

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method of associating session tickets, the method comprising the steps of:
    (a) receiving, by a ticketing authority server, a ticket generation request and information about a client node;
    (b) identifying, by the ticketing authority server, a master session ticket stored in a storage element and associated with the client node;
    (c) generating, by the ticketing authority server, a derivative session ticket for the client node;
    (d) assigning to the derivative session ticket, by the ticketing authority server, one of a plurality of session profile types configured by a policy engine, the assigned session profile type including a session expiration date for the derivative session ticket;
    (e) associating, by the ticketing authority server, the derivative session ticket with the master session ticket; and
    (f) storing, by the ticketing authority server, information about the client node and the derivative session ticket in the storage element.

2. The method of claim 1 wherein step (b) further comprises identifying a master session ticket for the client node by using the received information to query the storage element.

3. The method of claim 1 wherein step (c) comprises generating a master session ticket for the client node.

4. The method of claim 1 wherein step (c) further comprises assigning, by the ticketing authority server, the session profile type to the derivative session ticket, the session profile type including at least one of: session renewable rights and session failure reconnection rights.

5. The method of claim 1 wherein step (e) further comprises associating, by the ticketing authority server, the derivative session ticket and the master session ticket by storing a reference to the derivative session ticket in the storage element entry for the master session ticket.

6. A system for associating session tickets comprising:
a master session ticket;
a derivative session ticket;
a policy engine configuring a plurality of session profile types; and
a ticketing authority server receiving a ticket generation request and information about a client node, identifying the master session ticket associated with the client node, generating the derivative session ticket for the client node, assigning to the derivative session ticket one of the plurality of session profile types, associating the derivative session ticket with the master session ticket, and storing information about the client node and the derivative session ticket in a storage element, wherein the assigned session profile type includes a session expiration date for the derivative session ticket.

7. The system of claim 6 wherein the master session ticket further comprises a client identifier.

8. The system of claim 7 wherein the client identifier comprises a user name.

9. The system of claim 7 wherein the client identifier comprises a domain name.

10. The system of claim 6 wherein the master session ticket further comprises one of the plurality of session profile types configured via a policy engine.

11. The system of claim 6 wherein the assigned session profile type includes at least one of: session renewable rights and session failure reconnection rights.

12. The system of claim 6 wherein the derivative session ticket further comprises a reference to the master session ticket.

13. A method of renewing associated session tickets, the method comprising the steps of:
receiving, by a ticket authority server, a session ticket renewal request and a session ticket;
retrieving, by the ticket authority server, the session associated with the received session ticket;
renewing, by the ticket authority server, a session expiration date of the session;
retrieving, by the ticket authority server, a master session ticket associated with the received session ticket;
renewing, by the ticket authority server, a session expiration date of the master session ticket;
retrieving, by the ticket authority server, any derivative ticket associated with the master session ticket; and
renewing, by the ticket authority server, a session expiration date of the derivative session ticket associated with the master session ticket.

14. The method of claim 13 wherein step (b) further comprises querying a storage element to retrieve session information associated with the received session ticket.

* * * * *